United States Patent [19]

Hasegawa

[11] Patent Number: 4,583,610
[45] Date of Patent: Apr. 22, 1986

[54] POWER STEERING APPARATUS

[75] Inventor: Akira Hasegawa, Toyota, Japan

[73] Assignee: Toyota Jidosha Kabushiki Kaisha, Toyota, Japan

[21] Appl. No.: 673,930

[22] Filed: Nov. 21, 1984

[30] Foreign Application Priority Data

Nov. 22, 1983 [JP] Japan .................. 58-220090

[51] Int. Cl.$^4$ ............................. B62D 5/08
[52] U.S. Cl. ..................... 180/143; 91/375 A
[58] Field of Search ............... 180/148, 143, 141; 91/375, 434

[56] References Cited

U.S. PATENT DOCUMENTS

| 3,465,842 | 9/1969 | Hraska | 91/375 A |
| 3,930,554 | 1/1976 | Ward | 91/375 A |
| 4,034,825 | 7/1977 | Adams | 180/143 |
| 4,373,598 | 2/1983 | Elser | 180/143 |
| 4,481,866 | 11/1984 | Matouka | 91/375 A |

FOREIGN PATENT DOCUMENTS 966431 8/1964 United Kingdom ............ 91/375 A

Primary Examiner—John A. Pekar
Assistant Examiner—Mark C. Dukes
Attorney, Agent, or Firm—Oblon, Fisher, Spivak, McClelland & Maier

[57] ABSTRACT

A power steering apparatus comprises an input member rotatably mounted in a valve housing, an output member rotatably mounted in a gear housing integral with the valve housing and arranged coaxially with the input member, a valve rotor integral with the input member, a valve sleeve rotatably mounted in the valve housing and arranged in surrounding relationship with the valve rotor, the valve sleeve being connected integrally with the output member to cooperate with the valve rotor for selectively directing fluid under pressure to opposite ends of a hydraulic power cylinder in response to relative rotation between the input and output members, a cylindrical member fixed to the outer end of the output member, an axial rod rotatably disposed in an internal axial bore in the output member and having an inner end fixed to the input member and an outer end rotatable in the interior of the cylindrical member, a piston axially slidably disposed in the cylindrical member and rotatable integrally with the cylindrical member, a cam mechanism arranged between the outer end of the axial rod and the piston for permitting relative rotation between the input and output members, and a pressure mechanism arranged to apply fluid under pressure responsive to the vehicle speed to the piston for increasing the resistance to relative rotation of the input member and the output member in accordance with the vehicle speed.

9 Claims, 2 Drawing Figures

POWER STEERING APPARATUS

BACKGROUND OF THE INVENTION

The present invention relates to a power steering apparatus for providing a hydraulic power assist to the driver's steering effort applied to the steering wheel of an automotive vehicle, and more particularly to a power steering apparatus of the type which is capable of decreasing the hydraulic power assist in accordance with increase of the vehicle speed.

As one of power steering apparatuses of this kind, a power steering apparatus of the rotary valve type has been proposed in the U.S. Pat. No. 4,034,825 issued on July 12, 1977, which power steering apparatus comprises a valve housing, an input member in the form of an inner rotating valve sleeve rotatably mounted in the valve housing, an output member arranged coaxially with the input member for relative rotation, and an outer valve sleeve rotatably coupled over the inner valve sleeve and connected integrally with the output member to cooperate with the inner valve sleeve in response to relative rotation between the input and output members thereby to selectively direct fluid under pressure from a source of hydraulic pressure to opposite ends of a hydraulic power cylinder. In this prior proposal, a torsion bar is adapted to interconnect the input and output members for permitting relative rotation between the input and output members, a pair of axial recesses are formed in the inner valve sleeve, and a pair of balls are positioned in the axial recesses and caged in a pair of radial bores in the thick end part of the outer valve sleeve to effect the resistance to relative displacement between the inner and outer valve sleeves. The balls are further arranged to be applied with a hydraulic pressure from a secondary hydraulic pump responsive to the vehicle speed. Thus, the balls act to increase the resistance to relative displacement between the inner and outer valve sleeves in proportion to the vehicle speed. In such arrangement, the assembly of the input and output members in the valve housing is complicated due to provision of the torsion bar. Additionally, it is required to maintain the hydraulic pressure applied to the balls at a high level for effecting the resistance to relative rotation between the inner and outer valve sleeves, resulting in power loss of the prime mover of the vehicle.

SUMMARY OF THE INVENTION

It is, therefore, a primary object of the present invention to provide a power steering apparatus wherein a cam mechanism is adapted to permit relative rotation between input and output members without provision of such a torsion bar as described above, and wherein the cam mechanism is arranged to be applied with a hydraulic pressure from a source of fluid under pressure responsive to the vehicle speed for effecting the resistance to relative rotation between the input and output members in accordance with increase of the vehicle speed.

Another object of the present invention is to provide a power steering apparatus, having the above-described characteristics, wherein the hydraulic pressure applied to the cam mechanism can be maintained at a relatively low level.

A further object of the present invention is to provide a power steering apparatus, having the above-described characteristics, the torsional rigidity of which is reliably ensured in a simple construction.

A still another object of the present invention is to provide a power steering apparatus, having the above-described characteristics, capable of adjusting in a simple manner a hydraulic power assist to the driver's steering effort applied to the steering wheel.

According to the present invention there is provided a power steering apparatus for an automotive vehicle including a primary source of fluid under pressure, a secondary source of fluid under pressure responsive to the vehicle speed for supply of fluid under pressure in proportion to the vehicle speed, and a hydraulic power cylinder for providing a hydraulic power assist to the driver's steering effort applied to the steering wheel of the vehicle. The power steering apparatus comprises a housing, an input member rotatably mounted in the housing, an output member rotatably mounted in the housing and coupled at its inner end with the inner end of the input member for relative rotation, a valve rotor rotatable integrally with the input member, a valve sleeve rotatably mounted in the housing and arranged in surrounding relationship with the valve rotor, the valve sleeve being connected integrally with the output member to cooperate with the valve rotor for selectively directing fluid under pressure from the primary source to opposite ends of the power cylinder in response to relative rotation between the input and output members, a cylindrical member fixed to the outer end of the output member, an axial rod rotatably disposed in an internal axial bore in the output member and having an inner end fixed to the input member and an outer end rotatable in the interior of the cylindrical member, a piston axially slidably disposed in the cylindrical member and rotatable integrally with the cylindrical member, a cam mechanism arranged between the outer end of the axial rod and the piston for permitting relative rotation between the input and output members upon the application of a predetermined torque to the input member, and a pressure mechanism arranged to apply fluid under pressure responsive to the vehicle speed to the piston for increasing the resistance to relative rotation between the input and output members in accordance with increase of the vehicle speed.

In the actual practices of the present invention, it is preferable that the cam mechanism comprises a cam follower element integral with the piston, the cam follower element being formed with a pair of solid cam surfaces, and the axial rod being formed at its outer end with a pair of recessed cam surfaces which confront with the solid cam surfaces. It is further preferable that the pressure mechanism comprises a closure member detachably fixed to an opening end of the cylindrical member and cooperating with the piston to define a pressure chamber in communication with the secondary source of fluid under pressure, and a resilient member supported on the inner end of the closure member to bias the piston toward the cam mechanism.

BRIEF DESCRIPTION OF THE DRAWINGS

Other objects and attendant advantages of the present invention will become more readily apparent from the following detailed description of a preferred embodiment thereof when considered in connection with the attached drawings in which.

DETAILED DESCRIPTION OF THE PREFERRED EMBODIMENT

Figure 1:
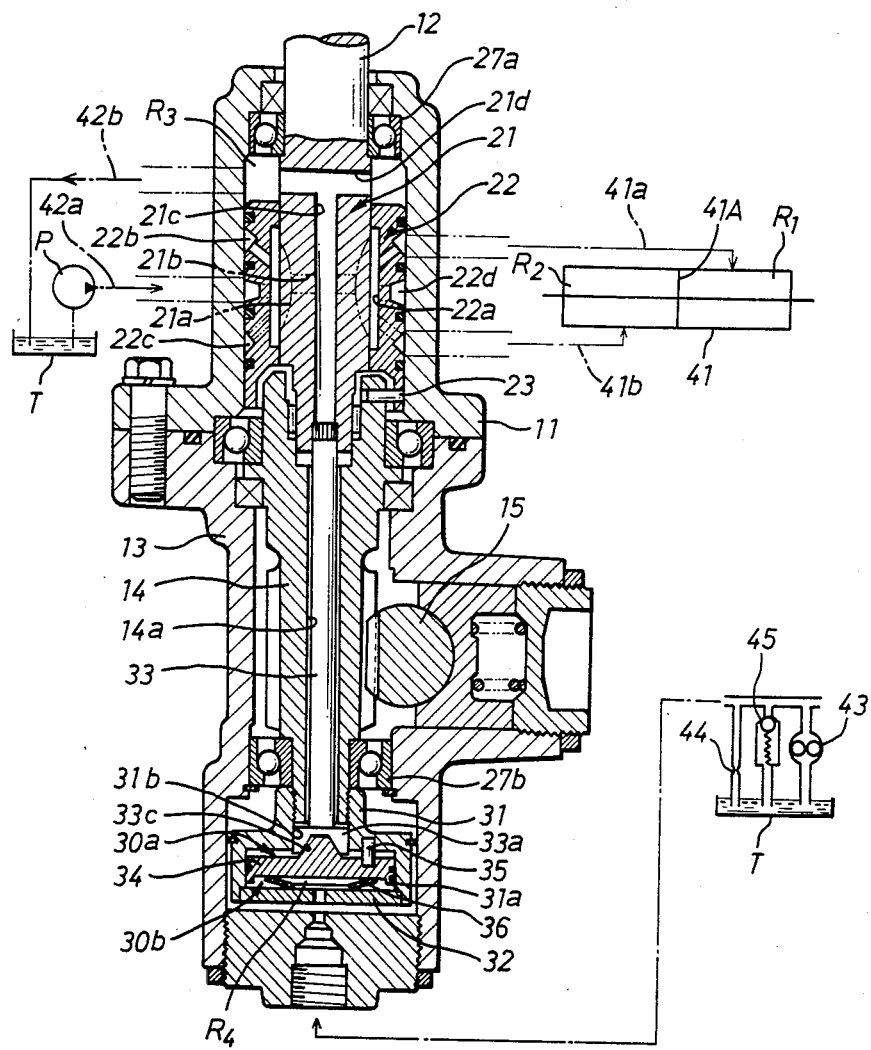
FIG. 1 illustrates in cross sectional form a power steering apparatus in accordance with the present invention.

Referring now to the drawings, there is illustrated a power steering apparatus of the rack and pinion type in accordance with the present invention. The power steering apparatus includes a valve housing 11 that has an input member or shaft 12 rotatably mounted therein by means of a ball bearing 27a. The valve housing 11 is formed integrally with a gear housing 13 that has an output member 14 in the form of a pinion shaft rotatably mounted therein by means of a ball bearing 27b. The input and output members 12 and 14 are coaxially arranged and coupled at their inner ends for relative rotation. The input member 12 is adapted to be connected to the steering shaft and steering wheel (not shown) of the automotive vehicle in which the power steering apparatus is mounted. The output member or pinion shaft 14 is permanently in mesh with a rack member 15 which is connected to a power piston 41A in a hydraulic power cylinder 41 as is schematically illustrated in the figure. The rack member 15 is further operatively connected to the steerable road wheels of the vehicle through a standard linkage mechanism (not shown).

An intermediate portion of the input member 12 is formed as a valve rotor 21 which is coupled within a valve sleeve 22 for relative rotation. The valve rotor 21 is formed in its outer circumference with a plurality of circumferentially equi-spaced axial grooves 21a of semi-circular cross-section and is formed therein with a plurality of radial passages 21b which communicate a part of the axial grooves 21a into an internal axial bore 21c in the input member 12. The valve rotor 21 is further formed therein with a radial passage 21d which extends across the outer end of internal axial bore 21c and is located above the valve sleeve 22. The valve sleeve 22 is arranged in surrounding relationship with the valve rotor 21 and connected to the inner end of output member 14 by means of a lateral pin 23. Thus, the valve sleeve 22 cooperates with the valve rotor 21 to provide a standard rotary change-over valve.

In the above arrangement, the valve sleeve 22 is formed in its inner circumference with a plurality of circumferentially equi-spaced axial grooves 22a and formed in its outer circumference with first and second annular grooves 22b and 22c. A part of axial grooves 22a is in open communication with the first annular groove 22b, while the other part of axial grooves 22a is in open communication with the second annular groove 22c. The first annular groove 22b is connected to a right-hand pressure chamber $R_1$ in power cylinder 41 by way of a hydraulic fluid circuit 41a, while the second annular groove 22c is connected to a left-hand pressure chamber $R_2$ in power cylinder 41 by way of a hydraulic fluid circuit 41b. The valve sleeve 22 is further formed in its outer circumference with a third annular groove 22d which is connected through a hydraulic fluid circuit 42a to a primary source of fluid under pressure in the form of a hydraulic pump P driven by a prime mover of the vehicle. The third annular groove 22d is alternately in open communication with the internal axial grooves 22a in a usual manner. A fluid chamber $R_3$ defined by the upper end of valve sleeve 22 is in open communication with the internal axial bore 21c through radial passage 21d and is connected to a reservoir tank T by way of a hydraulic fluid circuit 42b.

When relative rotation occurs between the input member 12 and the output member 14, fluid under pressure from the source of hydraulic pressure P is supplied into the third annular groove 22d in valve sleeve 22 by way of the fluid circuit 42a and is selectively supplied to one of the pressure chambers $R_1$ and $R_2$ in power cylinder 41 across one part of the axial grooves 22a, one of the annular grooves 22b and 22c, and one of the fluid circuits 41a and 41b, while the exhaust fluid from the other pressure chamber $R_2$ or $R_1$ in power cylinder 41 is discharged into the reservoir tank T by way of the other fluid circuit 41b or 41a, annular groove 22c or 22b, radial passages 21b, internal axial bore 21c, radial passage 21d and fluid circuit 42b. This will provide a hydraulic power assist to the driver's steering effort applied to the steering wheel during turning maneuvers of the vehicle.

Figure 2:
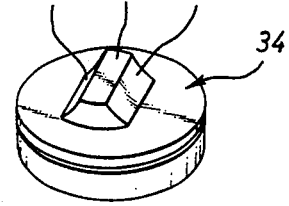
FIG. 2 is a perspective view of a cam follower element integral with a piston assembled in the power steering apparatus.

In the power steering apparatus, it should be noted that a cam mechanism 30a is provided to occur relative rotation between the input and output members 12 and 14 upon the application of a predetermined torque to the input member 12. The cam mechanism 30a is associated with a pressure mechanism 30b responsive to the vehicle speed for effecting the resistance to relative rotation between the input and output members 12 and 14 in accordance with increase of the vehicle speed. For provision of the cam mechanism 30a, an axial rod 33 is rotatably disposed in an internal axial bore 14a in the output member 14, and a cylindrical member 31 is fixed to the outer end of output member 14. The axial rod 33 has an inner end fixed to the inner end of input member 12 and an outer end 33a rotatable in a cylinder portion 31b of small diameter formed in the cylindrical member 31. In such arrangement, the cam mechanism 30a comprises a cam follower element 34a integral with a piston 34 which is axially slidably disposed within a cylinder portion 31a of large diameter in the cylindrical member 31. As can be well seen in FIG. 2, the cam follower element 34a is formed with a pair of solid cam surfaces 34b, 34b which are slidably in engagement with a pair of recessed cam surfaces 33c, 33c formed in the outer end 33a of rod 33. A closure member 32 is detachably fixed to an opening end of cylindrical member 31 and cooperates with the piston 34 to define a variable pressure chamber $R_4$. The piston 34 is connected to the cylindrical member 31 by means of an axial pin 35 which has opposite ends slidably inserted into the cylindrical member 31 and the piston 34 to restrict relative rotation between the cylindrical member 31 and the piston 34. Thus, the piston 34 is arranged to be axially slidable in the cylindrical member 31 and rotatable integrally with the cylindrical member 31. The pressure mechanism 30b comprises a dish spring 36 supported on the inner end of closure member 32 to bias the piston 34 toward the outer end 33a of rod 33 thereby to eliminate lost motion or backlash in engagement between the recessed cam surfaces 33c, 33c and the solid cam surfaces 34b, 34b. The dish spring 36 can be replaced with another dish spring by removal of the closure member 32. The pressure chamber $R_4$ is connected to a secondary source of fluid under pressure responsive to the vehicle speed, which source may comprise a hydraulic pump 43 driven by a propeller shaft of the vehicle, a manually adjustable orifice means 44 for regulating an initial hydraulic pressure applied to the pressure chamber $R_4$, and a relief valve 45 for determining a maximum value of the hydraulic pressure. Thus, the pressure mechanism 30b is arranged to increase the resistance to relative rotation between the input and output members 12 and 14 in accordance with increase of the vehicle speed.

Assuming that the input member 12 is applied with an input torque in steering operation, the cam follower element 34a will cooperate with the recessed cam surfaces 33c, 33c in the lower end 33a of rod 33 to effect axial movement of the piston 34 against the load of dish spring 36 in accordance with the driver's steering effort applied to the steering wheel. This will permit relative rotation between the input and output members 12 and 14. If the pressure in chamber $R_4$ is below a predetermined level at which power assist is needed, relative rotation between the valve rotor 21 and the valve sleeve 22 will occur in response to the axial movement of piston 34. As a result, the rotary change-over valve will act to establish fluid communication between one of the pressure chambers $R_1$ and $R_2$ in power cylinder 41 and the pressure supply circuit and to establish fluid communication between the other pressure chamber in power cylinder 41 and the exhaust circuit. The resulting pressure differential across the power piston 41a provides a hydraulic power assist to the driver's steering effort applied to the steering wheel.

If the pressure in chamber $R_4$ increases in accordance with increase of the vehicle speed, the axial movement of piston 34 is restricted in accordance with increase of the pressure in chamber $R_4$ to decrease the relative rotation between the valve rotor 21 and the valve sleeve 22. As a result, the rotary change-over valve will act to decrease the level of hydraulic pressure applied to the power cylinder 41. Thus, the hydraulic power assist to the driver's steering effort will decrease in accordance with increase of the vehicle speed. If the pressure in chamber $R_4$ is in excess of the predetermined level, the cam follower element 34a does not permit relative rotation between the input and output members 12 and 14. Thus, the rotary motion applied to the input member 12 is applied directly to the output member 14 to operate the steering apparatus as a manual gear.

In the construction of the power steering apparatus described above, provision of the cam mechanism 30a and the associated pressure mechanism 30b serves to enhance torsional rigidity of the steering apparatus without provision of a conventional torsion bar. As the cam mechanism 30a is previously applied with the load of dish spring 36, the initial pressure in chamber $R_4$ of the pressure mechanism 30b can be regulated at a relatively low level. The driver's steering effort can be adjusted in a simple manner by replacement of the dish spring 36.

Although in the above embodiment, the cam follow element 34a is integrally formed with the piston 34, it may be integrally formed on the outer end 33a of rod 33. In such a case, the recessed cam surfaces 33c, 33c are formed in the piston 34. It is also noted that the valve rotor 21 may be replaced with an independent valve rotor integrally connected to the input member 12. Furthermore, the secondary source of fluid under pressure for the pressure mechanism 30b may be arranged to be further responsive to a lateral acceleration of the vehicle, the speed of steering operation and the like.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A power steering apparatus for an automotive vehicle including a primary source of fluid under pressure, a secondary source of fluid under pressure responsive to the vehicle speed for supply of fluid under pressure in proportion to the vehicle speed, and a hydraulic power cylinder for providing a hydraulic power assist to the driver's steering effort applied to the steering wheel of the vehicle, the power steering apparatus comprising:

a housing;

an input member rotatably mounted in said housing;

an output member rotatably mounted in said housing and coaxially coupled at its inner end with the inner end of said input member for relative rotation;

a valve rotor rotatable integrally with said input member;

a valve sleeve rotatably mounted in said housing and arranged in surrounding relationship with said valve rotor, said valve sleeve being connected integrally with said output member to cooperate with said valve rotor for selectively directing fluid under pressure from said primary source to opposite ends of said power cylinder in response to relative rotation between said input and output members;

a cylindrical member fixed to the outer end of said output member;

an axial rod rotatably disposed in an internal axial bore in said output member and having an inner end fixed to the inner end of said input member and an outer end rotatable in the interior of said cylindrical member;

a piston axially slidably disposed in said cylindrical member and rotatable integrally with said cylindrical member;

a cam mechanism arranged between the outer end of said axial rod and said piston for permitting relative rotation of said input and output members upon the application of a predetermined torque to said input member; and a pressure mechanism arranged to apply a hydraulic pressure from said secondary source to said piston for increasing the resistance to relative rotation between said input and output members in accordance with increase of the vehicle speed.

2. A power steering apparatus according to claim 1, wherein said cam mechanism comprises a cam follower element integral with said piston, said cam follower element being formed with a pair of solid cam surfaces, and said axial rod being formed in its outer end with a pair of recessed cam surfaces which confront with said solid cam surfaces.

3. A power steering apparatus according to claim 1, wherein said pressure mechanism comprises a resilient member arranged within said cylindrical member to bias said piston toward said cam mechanism for applying an intial resistance to relative rotation between said input and output members.

4. A power steering apparatus according to claim 3, wherein said resilient means is a dish spring.

5. A power steering apparatus according to claim 1, wherein said pressure mechanism comprises a closure member fixed to an opening end of said cylindrical member and cooperating with said piston to define a pressure chamber in communication with said secondary source of fluid under pressure.

6. A power steering apparatus according to claim 5, wherein said pressure mechanism further comprises a resilient member supported on the inner end of said closure member for biasing said piston toward said cam mechanism.

7. A power steering apparatus according to claim 6, wherein said closure member is detachably fixed to the opening end of said cylindrical member for replacement of said resilient member.

8. A power steering apparatus according to claim 1, wherein said valve rotor is integrally formed with an intermediate portion of said input member.

9. A power steering apparatus according to claim 1, wherein said output member is in the form of a pinion shaft in mesh with a rack bar which is operatively connected to said hydraulic power cylinder and to the steerable road wheels of the vehicle.

* * * * *